United States Patent
Kostur

[15] 3,703,247
[45] Nov. 21, 1972

[54] GRAIN DISPENSING APPARATUS

[72] Inventor: Nykola Kostur, 1026 Brunette Avenue, New Westminster, British Columbia, Canada

[22] Filed: March 10, 1971

[21] Appl. No.: 122,705

[30] Foreign Application Priority Data

April 2, 1970 Canada......................078,932

[52] U.S. Cl. ...............222/442, 222/450, 222/481.5
[51] Int. Cl..............................................G01f 11/28
[58] Field of Search........222/56, 442, 450, 556, 449, 222/481.5

[56] References Cited

UNITED STATES PATENTS

| | | | |
|---|---|---|---|
| 3,421,666 | 1/1969 | Lawson | 222/442 |
| 3,365,240 | 1/1968 | Gordon | 222/450 X |
| 2,694,515 | 11/1954 | Green | 222/556 X |

Primary Examiner—Robert B. Reeves
Assistant Examiner—John P. Shannon, Jr.
Attorney—Fetherstonhaugh & Co.

[57] ABSTRACT

A tank connected at one end to a pipe through which granular material is delivered into the tank and into which a stream of air is drawn counter to the flow of material. The tank has a spout at the opposite end fitted with a manually controlled gate valve. A flap valve is fitted to the end of the delivery pipe within the tank. A by-pass tube extends from the spout to the upper end of the tank and the inlet end of the tube is sealed off by the gate valve in closed position. When a body of material impinges on the flap valve, this normally partially open valve is forced further open to allow the material to drop into the tank. When the gate valve is opened to empty the material from the tank, air pressure reaches the upper end of the tank through the by-pass tube and the flap valve automatically is closed to prevent some of the material from being entrained in the counterflowing air stream.

4 Claims, 4 Drawing Figures

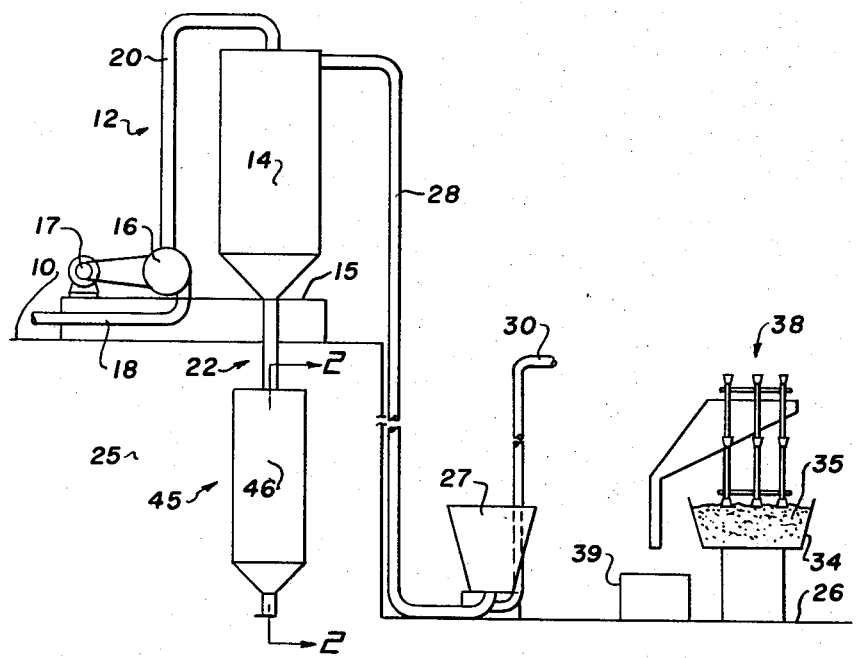
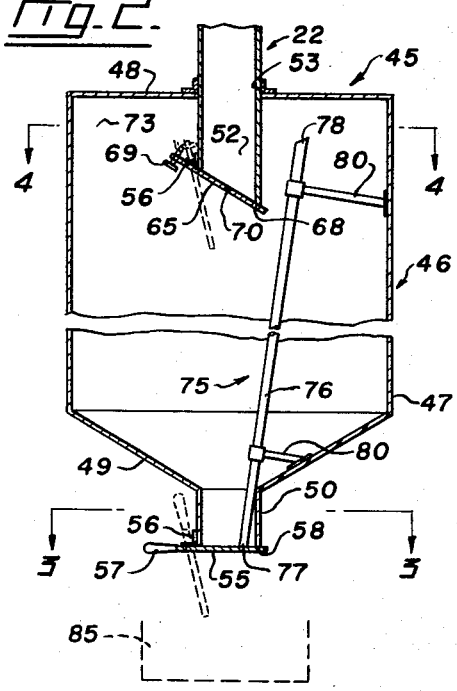
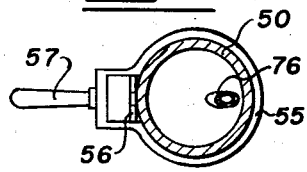
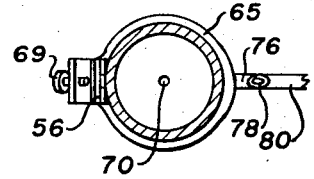
INVENTOR
NYKOLA KOSTUR
BY
*Fetherstonhaugh & Co.*
ATTORNEYS

GRAIN DISPENSING APPARATUS

My invention relates to improvements in a device for dispensing selected amounts of granular material, the device being particularly intended to form part of a grain sample delivery system.

When grain is delivered to an elevator for temporary storage or transfer to the hold of a ship, it is customary to take samples of the grain for examination as to quality and possible contamination. Equipment presently in use for delivering the samples to a place of inspection requires frequent maintenance and regular cleaning which has proven to be bottleneck in the handling of grain in a busy elevator. For example, a conventional system in common use today employs a rotary vane-type feeder which is connected into a pipe leading from a cyclone to the inspector's office. This feeder serves to cut off air flow through the pipe and into the cyclone and to drop grain intermittently into said pipe in quite small amounts. The paddle action of the vanes rotating in a closely confining housing tends to damage the grain to some extent and foreign objects in the grain such as nails or stones will cause frequent breakdowns of the feeder which seriously reduces the operating time of the elevator. In addition, damp grain tends to clog the feeder and this must be remedied without undue delay otherwise the samples tested do not give a proper indication of the quality and condition of the shipment of grain. Furthermore, the feeder itself requires lubrication and this has been known to contaminate the grain so that the subsequent test provides misleading information.

I have overcome the above mentioned disadvantages of conventional grain delivery systems by installing apparatus having relatively few moving parts none of which are likely to become clogged by wet grain or jammed by foreign objects so that very little maintenance is required. The grain passing through the device does not come into contact with any oiled or greased parts which might cause contamination. During the passage of the grain through a system equipped with my dispensing apparatus, the grain floats on a cushion of air and thus is protected from damage. This feature is extremely important since barley, for example, is graded according to the number of peeled or broken kernels in a sample and obviously any tests made of grain damaged by the handling equipment is not truly representative of the condition of the grain shipment.

In drawings which illustrate a preferred embodiment of the invention,

FIG. 1 is a schematic view showing the present dispensing apparatus installed to form part of a typical grain sample delivery system, FIG. 2 is an enlarged fragmentary section taken on the line 2—2 of FIG. 1, and FIGS. 3 and 4 respectively are further enlarged horizontal sections taken on the lines 3—3 and 4—4 of FIG. 2.

Referring to FIG. 1, the line indicated by the numeral 10 is intended to represent the roof of a grain elevator which is equipped with a sample delivery system generally indicated at 12. The system 12 includes equipment some of which is mounted on the roof 10, the equipment comprising a cyclone 14 which stands on a platform 15. The platform 15 also supports a blower 16 which is belt and pulley connected to an electric motor 17, the blower having an exhaust pipe 18. A pipe 20 connects the intake side of the blower 16 to the top of the cyclone 14. A vertically disposed delivery pipe 22 extends from the bottom of the cyclone 14, through the roof 10, and into an office 25 where samples of each grain shipment are inspected. A grain elevator normally has another floor 26 which may be some distance below the office 25 and it is on this floor where the grain samples are obtained. Additional equipment of the system 12 is mounted on the floor 26 and this equipment includes a hopper 27 which is connected to the top of the cyclone 14 by a lengthy run of pipe 28. An air inlet pipe 30 connects with the pipe 28 below the hopper 27. A conveyor 34 is mounted on the floor 26 to convey grain 35 through that particular room for deposit in a storage bin or delivery to the hold of a ship. Mounted above the conveyor 34, is a grain sampler generally indicated at 38. The mechanical sampler 38 is operated by a motor (not shown) to pick up grain from the conveyor 34 and deposit it in a container 39.

I propose to provide the grain sample delivery system 12 with dispensing apparatus which is generally indicated by the numeral 45 in FIGS. 1 and 2. As shown best in FIG. 2, the apparatus 45 comprises a cylindrical holding tank 46 which is suitably supported below the ceiling of the office 25 at an appropriate distance above the office floor. Preferably, the tank 46 is made of clear plastic so that the level of grain therein can be determined at a glance and desirably the volume of said tank is about three times that of the container 39. The tank 46 has a peripheral wall 47, a top wall 48, and a conical bottom wall 49 which is provided with a discharge spout 50. The cyclone delivery pipe 22 has a lower end 52 which extends through an opening 53 formed in the top wall 48. Pipe 22 is concentric to the peripheral wall 47 and is sealed within the opening 53 so that the adjacent part of the tank 46 is substantially airtight.

The discharge spout 50 is fitted with a gate valve 55 which is connected thereto by a hinge 56, see FIGS. 2 and 3. A handle 57 is fitted to the gate valve 55 so that it can be swung manually from a closed to an open position. In the closed position, the gate valve 55 bears against lower edge 58 (FIG. 2) of the spout 50 and forms a graintight and substantially airtight seal therebetween. It will be noted that the handle 57 serves as a counterbalance for the valve 55, the valve at times being free to swing about the hinge 56. Handle 57 weighs slightly less than the gate valve 55 so that said valve normally will assume a slightly open position if it is left untouched when the cyclone 14 is not in operation.

Referring now to FIGS. 2 and 4, the numeral 65 indicates a flap valve which is mounted on the lower end 52 of the cyclone delivery pipe. A hinge 56 secures the flap valve 65 to the pipe end 52 and said valve is adapted to close against a beveled lower edge 68 (FIG. 2) of said pipe. The flap valve 65 is fitted with a counterweight 69 which weighs only slightly less than the valve. Thus, the flap valve 65 normally will also assume a slightly open position whenever the grain sample delivery system 12 is shut down and also when the blower 16 is in operation with the gate valve 55 closed. The flap valve 65 has a centrally disposed vent opening 70 which places the delivery pipe 22 in communication with upper end 73 of the holding tank 46 when said valve is closed against the beveled edge 68 by the air pressure differential which is developed on opposite sides of the valve whenever the valve 55 is opened with the grain sampling delivery system in operation.

The grain dispensing apparatus 45 includes air conducting means generally indicated at 75 for connecting the upper end 73 of the holding tank with the atmospheric air surrounding said tank. As shown best in FIG. 2, the means 75 comprises a by-pass tube 76 having an inlet end 77 and an outlet end 78. Tube 76 is secured by any suitable means such as a pair of brackets 80 to the inner surface of the tank 46 so that the inlet end 77 is disposed in the horizontal plane of the lower edge 58 of the discharge spout. The outlet end 78 of the by-pass tube is located within the upper end 73 of the holding tank, preferably near the top wall 48 so that normally it will not be filled with grain falling into the tank from the delivery pipe 22.

When a shipment of grain is delivered to the elevator, the system 12 is operated to deliver samples of that shipment for inspection. The motor 17 is started to run the blower 16 whereupon air is drawn into the cyclone 14 through the pipes 30 and 28, the air only being discharged therefrom through the pipe 18. Air is also pulled into the cyclone 14 through the delivery pipe 22 and this inflow of air causes the gate valve 55 to snap shut so that the holding tank 46 is readied to receive a grain sample.

The sampler 38 is run to pick up a portion of the grain 35 being moved by the conveyor 34 and when a sufficient amount of grain has been deposited in the container 39, an operator dumps the contents of the container into the hopper 27. The cyclone 14 drops the grain sample into the delivery pipe 22 to strike the partially opened flap valve 65. When the grain sample rains down upon the valve 65, the freely swinging flap valve is swung by the cascading grain between a partially open position and a fully opened position depending on the weight and volume of the grain and this flap movement allows the material to drop into the tank 46. It is possible for valve 65 to open quite readily since the vent opening 70 reduces the clamping action of the vacuum within the pipe 22. The flap valve 65 is disposed at an angle which is slightly steeper than the angle of the beveled edge 68 and this too ensures a particularly easily opening movement of said valve. Also, although the flap valve 65 is counterbalanced by the weight 69, the slightly greater weight of the valve is added to the weight of the grain to bring about the aforesaid opening movement.

When the grain drops into the holding tank 46, it is supported on the gate valve 55 which then is being held fairly tightly closed by external air pressure. The pressure of air holding the gate valve 55 closed is developed by air attempting to enter the spout 50 to relieve the partial vacuum within the tank 46. Some air does leak passed the gate valve 55 when it is closed but this is not sufficient to reduce the closing force being applied to said valve.

At appropriate intervals, a second operator empties the contents of the tank 46 into a suitable container 85 which is then placed to one side so that a sample can later be tested. To empty the tank 46, the operator places the container 85 in position below the spout 50 and swings the handle 57 upwardly against the force of air pressure. This opening movement of the gate valve 55 allows grain to start pouring into the container 85 and also uncovers the inlet end 77 of the bypass tube. Air can then reach the upper end 73 of the tank to apply closing pressure to the flap valve 65 and this effectively shuts off the vacuum within the pipe 22 so that the entire contents of the tank will fall freely into the container. The sample includes chaff and screenings as well as other lightweight particles and this material is dispensed from the tank along with the heavier kernals of grain when the flap valve 65 closes. This is important to the test which is to be conducted on the grain samples since if the lightweight particles were entrained in the air stream and carried back into cyclone 14, the test would not be true. When the operator releases the handle 57, the gate valve 55 is swung first by gravity to a partly closed position and from that position is snapped shut once again by air pressure. The closed valve 55 seals off the inlet end 77 of the by-pass tube and this allows the flap valve 65 to swing to a partly open position whereupon the dispensing apparatus 45 is ready to receive the next sample.

From the foregoing, it will be apparent I have provided dispensing apparatus which will keep each grain sample taken off the conveyor 34 completely separate from other samples. This is important since, if there is any intermingling of the samples, those samples must be declared void. The grain reaches the feed spout 50 without coming into contact with any moving parts other than the valves 65 and 55 and, of course, those valves do not damage or contaminate the grain which floats on the protective cushion of air throughout the remainder of the system. Since the flap valve 65 is closed automatically whenever the gate valve 55 is opened, the operator only has to contend with opening and closing the gate valve and handling the container 85 and he is assured that the entire sample is clear from the tank so as not to mix with the following sample.

I claim:

1. Apparatus for a grain sample delivery system including a cyclone having a grain delivery pipe through which air is drawn counter to the flow of grain, comprising a holding tank having an upper end, said delivery pipe having a lower end projecting into the upper end of the holding tank, a discharge spout on a lower end of the holding tank, a gate valve hingedly mounted on the discharge spout for free swinging movement between an open and a closed position with respect to said discharge spout, a flap valve hingedly mounted on the lower end of the delivery pipe, a tube extending between the discharge spout and the upper end of the holding tank, said tube having a lower end adapted to be sealingly engaged by the gate valve when in closed position.

2. Apparatus as claimed in claim 1, in which said flap valve has a vent opening adapted to connect the delivery pipe to the holding tank when said flap valve is closed.

3. Apparatus as claimed in claim 2 and including a counterweight on the flap valve which allows said flap valve to swing to a partially open position when the gate valve is closed.

4. Apparatus for a grain sample delivery system including a cyclone having a grain delivery pipe through which air is drawn counter to the flow of said grain, comprising a holding tank having an upper end enclosing a lower end of the delivery pipe, said holding tank having a discharge spout, a gate valve mounted on the discharge spout for controlling grain flow therethrough, a flap valve hingedly mounted on the lower end of the delivery pipe, said flap valve being partially open when the gate valve is closed and being adapted to swing freely whereby grain can drop from the delivery pipe into the holding tank, and air conducting means actuated in response to opening of the gate valve for connecting the upper end of the holding tank to atmosphere whereby to close the flap valve, said air conducting means comprising a tube having an outlet end extending into the upper end of the holding tank and an inlet end adjacent the gate valve, said inlet end being sealed against the admission of air by the gate valve in closed position.

* * * * *